Nov. 15, 1955   W. J. YOUNG   2,723,954
METHOD OF TREATING SEWAGE SLURRY
Filed March 9, 1951

Inventor
William J. Young
by
Douglas S. Johnson
atty.

United States Patent Office 2,723,954
Patented Nov. 15, 1955

2,723,954

METHOD OF TREATING SEWAGE SLURRY

William J. Young, Toronto, Ontario, Canada

Application March 9, 1951, Serial No. 214,711

12 Claims. (Cl. 210—2)

This invention relates to the disposal of sewage sludge and the principal object of the invention is to effect a complete, economical and entirely sanitary disposal of such sewage sludge or slurry as it comes from the digesting tanks of a sewage disposal plant to rid the municipality or community of a major and expensive nuisance problem.

Another important object is to eliminate disease germs in the water and on the grasses and weeds at the water's edge of streams now carry away surplus water from the sewage disposal systems.

Still a further object is the complete destruction of all obnoxious weed and plant seeds which come through in the night-soil.

A further object is to effect the recovery of a useful by-product in the form of a fertilizer filler as a result of the disposal process.

Still a further object is to enable control of such fertilizer by-product according to the requirements of the soil to be fertilized.

The principal feature of the invention resides in subjecting thin films of the moisture-laden slurry to heat from opposite sides to effect a rapid drying and a simultaneous destruction of germs and bacteria, then pulverizing the dry film to effect complete destruction and disintegration of any included weed or plant seeds.

More particularly according to the invention the water-laden slurry or sludge is caused to adhere as a thin coating to a heated aggregate presenting in total an extensive evaporation surface area. Then the aggregate is subsequently subjected to a tumbling action and heat to thoroughly dry the sludge coating and to fracture off the dried sludge encrustations which are subsequently drawn off together with such fragments of the aggregate as are ground off by the tumbling action.

With this arrangement the specific heat of the aggregate is utilized both for effecting adherence of the film thereto and destruction of germs and bacteria and also in conjunction with the external heat for rapid film drying.

Another feature of importance resides in recirculating the aggregate following removal of the encrustations by the tumbling process for further slurry pick-up whereby the retained heat of the aggregate is usefully employed to provide minimum fuel consumption in the process as well as reducing the amount of aggregate required.

A further feature consists in using as the aggregate a substance, such as agricultural limestone, open-hearth slag and the like having a soil nutritional value whereby in the tumbling action aggregate parts as well as the dried slurry are removed and subsequently collected and intimately mixed to increase the fertilizing value of the resulting by-product.

Still a further feature consists in providing a control for the by-product by selecting aggregate in accordance with the desired soil food value required.

These and other objects and features will become apparent from the following description taken in conjunction with the accompanying drawings, in which Figure 1 is a diagrammatic view illustrating the process according to the invention.

Figure 1:
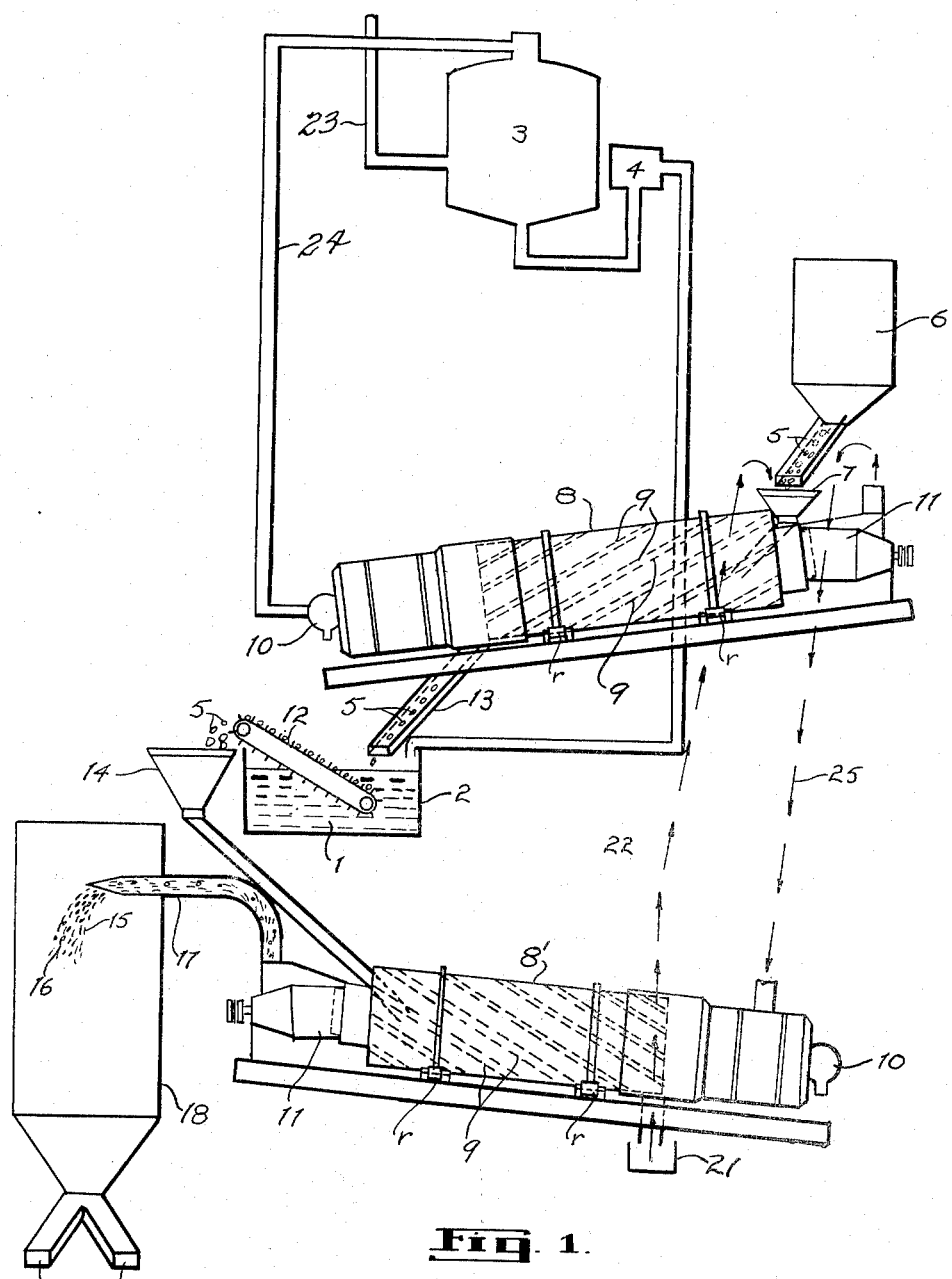
Figure 2:
Figure 2 is an elevational view of one of the aggregate pieces before being subjected to the slurry.

One of the major problems in communities and municipalities is sewage disposal and this problem has necessitated elaborate and extensive sewage disposal plants. In the most modern of these units the greatest cost of disposal is in disposing of the sewage sludge or slurry as it comes from the digesting tanks. At this point the average analysis of the slurry is approximately 96% moisture and 4% solid, that is, about 6 ounces of solids per imperial gallon of the mixture.

The disposal of such moisture-laden slurry is normally only completely effected by burning after it has been dried to a sixty percent moisture content in glass over filter bed and/or drum type vacuum filters. The labor and upkeep of the filter beds etc., the cost of the fuel for burning and the fact that no resulting useful product is produced renders this operation expensive and further, liberates dust particles or ash into the atmosphere in the vicinity of the disposal plant.

Moreover, in carrying off the surplus moisture from the disposal system with present disposal methods it is difficult to prevent disease germs from being deposited in the grasses and weeds at the water's edge along streams into which the disposal system empties.

It is the prime requisite of the present invention to eliminate this serious problem of disposal of the moisture-laden slurry without creating any nuisance and enabling the slurry to be reduced to a useful by-product in an economical and sanitary manner.

In the recovery of the solids from the slurry I have discovered that these solids in suspension will stick to a hot surface if allowed to contact the surface at a proper temperature, and that, if sufficient surface area can be presented to the slurry so that it forms only a thin spread, evaporation of the moisture can be relatively rapidly accomplished without the application of an undue quantity of heat.

This appreciation has led to utilization of an aggregate as a means to pick up material with the aggregate being heated to a sufficient temperature for adhesion. This temperature is from about 212° F. to about 325° F.

The sum total of the surface areas of the aggregate pieces presents an extremely extensive evaporating area for a relatively small volume of aggregate. The aggregate used may be for instance granite gravel, raw agricultural limestone, steel balls or broken slag from an open-hearth furnace, or any combination of these materials. Preferably however material such as limestone or slag, which contains calcium or phosphoric acid respectively is used so that the resultant product formed upon evaporation of liquids from the slurry has admixed therewith in the nature of pulverized aggregate particles, following the tumbling operation, a material having soil nutritional value.

With reference to the drawings my method will be more fully understood with the moisture-laden sludge or slurry 1 being shown fed to a receptacle 2 from the sludge digestion tank 3 by means of the sludge pump 4.

Feeding into this receptacle 2 is an aggregate 5, preferably with the pieces of aggregate having a major dimension of the order of three quarters to one inch and being of one of the materials such as raw agricultural limestone or broken slag etc.

This aggregate is fed initially from a bin 6 into the hopper 7 of a rotating drum 8 of the type well known in the art as a sand or asphalt aggregate heater. This drum 8 running on rollers includes angled ribs 9 which cause a tumbling action of the contents as the drum rotates.

A burner element 10 is arranged at one end of the drum to heat the contents and a fan indicated at 11 is provided to draw air through the drum.

The aggregate 5 in travelling through the drum 8, which forms the primary heating unit, is raised to a temperature by virtue of the burner 10 so that upon it being introduced into the slurry 1 the solids will stick to its exposed surfaces.

According to the method the introduction of the aggregate need only be momentary, and an elevator 12 is arranged to pick up the aggregate following delivery by the chute 13 almost immediately after it has been immersed. The aggregate thus is immersed in the slurry for a sufficient length of time to assume a complete coating, while at the same time the length of exposure is not sufficient to create any substantial loss of heat from the aggregate.

Once the aggregate is elevated again from the slurry the coating thereon is subjected to the heat of the enclosed aggregate pieces as a drying action.

To increase the speed of drying, the aggregate is then deposited in the hopper 14 and delivered to the drum 8' similar to the drum 8 and is subjected to external heat from the burner element 10.

Figure 3:
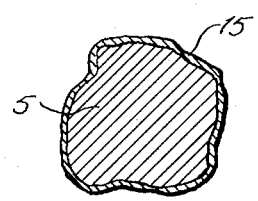
Figure 3 is a cross sectional view of a piece of the aggregate encrusted with slurry.

Thus the deposited slurry film on the aggregate is subjected to heat both from within and from without, and the thin slurry spread on the aggregate rapidly dries to an encrustation film 15, shown in Figure 3.

During movement of the encrusted aggregate in the drum 8' it is again subjected to a tumbling action by virtue of the ribs 9, and as a result the encrustation film 15 on the individual pieces is cracked and caused to break away from the surfaces to which it is adhered and is pulverized under the turning action. At the same time the tumbling and churning and rough contact between the aggregate pieces causes particles 16 of the aggregate to break away with the encrustation 15.

The aggregate particles or dust 16, together with the fragmented encrustations are removed by means of the exhaust fan 11 and delivered through the nozzle 17 into a collector bin 18, the contents of which may be bagged by drawing through suitable openings 19.

The use of the heated aggregate 5 is of vital importance as not only does it provide for the heating of the slurry film or deposit thereon from both sides but it enables a relatively small quantity of aggregate to pick up a substantial volume of slurry so that large quantities of slurry can be feasibly handled by use of a practical quantity of aggregate. For example, in tests conducted one hundred pounds of broken limestone of three quarter inch cubes heated to a temperature of approximately 212° F., when introduced into a sewage sludge comprising 80% moisture, picked up two hundred and thirty-four cubic inches of sludge. On the other hand, when one hundred pounds of the same aggregate at a temperature of 70° F. was introduced into sludge having the same moisture content, it picked up sixty cubic inches of sludge. Thus the aggregate heated to approximately 212° F. had approximately four times the capacity to pick up the slurry as had the aggregate having a temperature of 70° F. It is due to this startling increase in the capacity of the aggregate when heated to pick up the slurry that renders the aggregate pick-up method economically feasible and practical. It is to be noted that not only does the "cold" aggregate, that is, aggregate at ambient temperatures usually in the neighborhood of 70° F., pick up only one quarter of the amount of slurry as the preheated aggregate, but to handle a given volume of slurry in appreciably the same time four times the volume of the cold aggregate must be used. This presents not only serious problems in the handling of the large volume of cold aggregate which would be required but also in the decoating of the cold aggregate-coated slurry. The resulting product contains such a high percentage of the aggregate as to be of little more value as a fertilizer than the raw aggregate itself. On the other hand, in comparison, the coating or encrustations on the preheated aggregate are appreciably thicker, and under the heat coating operation the product removed by the exhaust fan 11 contains a much higher percentage of the slurry than possible with the cold aggregate to produce a valuable commercial fertilizer.

Figure 4:
Figure 4 shows the aggregate piece with the slurry encrustation as part of the aggregate piece itself removed after tumbling.

The de-coated aggregate 20 illustrated in Figure 4 is dropped from the "de-coating" drum 8' onto a suitable elevator indicated at 21 as a boot to receive the aggregate, and this elevator (not shown in detail) is arranged to convey the de-coated aggregate, as indicated by arrows 22, to redeposit such de-coated aggregate through the hopper 7 into the primary heating drum 8.

By virtue of the fact that the volume of the de-coated aggregate is less than the original aggregate submitted to the drum 8 additional aggregate from the bin 6 is added. It is important to note however that the major portion of the aggregate, being utilized to pick up the slurry 1, is recirculating aggregate which has already been heated and the heat supplied by the burner 10 of the primary heating drum 8 need only be sufficient to heat a relatively small volume of new aggregate added and to compensate for the minor heat loss of the recirculating aggregate occasioned in the transfer from rotating drum 8' where it is subjected to the heat from that drum to the drum 8, so that the quantity of heat required in the process is relatively small.

To further decrease the cost of heating combustible gas from the digestion tank 3, which is fed from the sewage disposal system through the inlet 23, is conducted from above the sludge through the outlet 24 to the burner element 10.

In collecting the aggregate dust and de-coated sludge encrustations the exhaust from the fan 11 of the primary heater drum 8 is conducted as indicated by the arrows 25 to the inlet end of the lower drum unit 8' and is then drawn together with such de-coated slurry particles and aggregate dust as is removed in the drum 8' through the nozzle 17.

In selecting the aggregate the soil deficiencies of the area where the product of de-coated slurry encrustations and aggregate particles are to be used as a fertilizer or fertilizer filler are taken into account. If lime is required to supplement the fertilizer limestone aggregate is used. If phosphoric acid is required or some other constituent present in slag the slag is used. The result is that a usable product is formed according to the process while at the same time the serious nuisance of sludge or slurry disposal is accomplished.

In the heating of the slurry spread on the aggregate heat more than sufficient to destroy germs and bacteria is utilized to render the product sanitary. Additionally, it is important to note that the tumbling action not only effects de-coating of the aggregate and the formation of aggregate dust but it also provides an action which grinds and effectively destroys obnoxious plant or weed seeds that come through the night-soil.

While the method has been described in conjunction with standard well known apparatus represented herein in diagrammatic form only, it will be appreciated that variation in the heating and agitating equipment may be made in the carrying out of the invention without departing from the scope of the appended claims.

What I claim as my invention is:

1. A method of treating sewage slurry from a digesting tank comprising momentarily introducing into a quantity of slurry an aggregate heated to a temperature at least approximately 212° F. and below the ignition temperature of the slurry to cause solids of the slurry to adhere thereto, subjecting the aggregate, while guiding same along an incline path, to external heat while maintaining the temperature of the slurry below its ignition temperature to effect drying of slurry adhered thereto both from within by virtue of the heat of the aggregate and from without, subjecting the aggregate with dried slurry encrustation thereon to a tumbling action while moving on the inclined path to break away such encrustations and any included weed seed together with small aggregate particles and to pulverize such encrustations, contained weed seeds and aggregate particles, and collecting such encrustations and aggregate broken away under the tumbling action.

2. A method of treating sewage slurry comprising picking up the slurry on the surfaces of pieces of carrier material by first heating said carrier pieces to a temperature of at least substantially 212° F. and below the ignition temperature of the slurry and then introducing the carrier pieces into the slurry to be coated thereby, then tumbling the coated carrier pieces together, and while tumbling subjecting same to heat.

3. A method as claimed in claim 2 in which said pieces of carrier material are heated to a temperature between 212° and 325° F.

4. A method as claimed in claim 2 in which the heated pieces of carrier material are dipped in a bath of slurry to pick up the slurry on the surfaces thereof.

5. A method as claimed in claim 2 in which the pieces of carrier material following coating and tumbling to remove the dried slurry are re-heated and re-introduced into the slurry to be treated.

6. A method of treating sewage slurry comprising, bringing the slurry into contact with the surfaces of pieces of carrier materials heated to a temperature of approximately 212° F. to cause the slurry to adhere thereto, subjecting the deposited slurry to heat additionally to the heat received from said surfaces to dry the deposit to a film, and tumbling the pieces of carrier material down an incline while the slurry thereon is being additionally heated to subject the film to a mechanical action to break same away from said surfaces, and collecting the film fragments.

7. A method of treating sewage slurry comprising, introducing into a quantity of slurry an aggregate heated to at least substantially 212° F. and below the ignition point of the slurry to effect adherence of slurry to the exposed surfaces, then upon the removal of the aggregate tumbling same through a heat zone to subject same to external heat to heat the slurry deposited thereon to dry the deposit from within by virtue of the heat of the aggregate and from without by such external heat while tumbling off the dried slurry deposit, and subjecting the removed slurry deposit to an air blast to separate same from said aggregate.

8. A method of treating sewage slurry from a digesting tank comprising, momentarily introducing into a quantity of slurry an aggregate containing constituents having soil food value heated to a temperature of at least 212° F. and below the ignition point of the slurry to cause solids of the slurry to adhere thereto and to effect destruction of bacteria therein, subjecting the aggregate to external heat to effect drying of slurry adhered thereto both from within by virtue of the heat of the aggregate and from without, subjecting the aggregate with dried slurry encrustations thereon to a tumbling action while the external heat is being applied to break away such encrustations upon becoming dried and any included weed seed together with small aggregate particles and to pulverize such encrustations, contained weed seeds and aggregate particles, subjecting the encrustations and aggregate particles broken away to air pressure to separate same from said aggregate, collecting such separated particles, and recirculating and reheating the aggregate for reintroduction into the slurry.

9. A method of treating sewage slurry comprising, creating a film of the slurry, and simultaneously subjecting opposite sides of said film to a heat of at least substantially 212° F. to dry said film from opposite sides thereof.

10. A method of treating sewage slurry comprising, forming an enveloping coating of slurry on a heated aggregate, and simultaneously applying a heat of at least substantially 212° F. on the internal and external surfaces of said coating to simultaneously dry said coating from opposite sides thereof.

11. A method of heat treating sewage slurry comprising, introducing into a slurry bath an aggregate heated to a temperature of at least substantially 212° F. and below 325° F. to cause said slurry to adhere to said aggregate to form a thick enveloping coating thereon, and while utilizing the stored heat in said aggregate as an internal heat source to dry said coating subjecting the coated aggregate to external heat to dry said coating from opposite sides thereof.

12. A method as claimed in claim 11 in which the dried coating is tumbled off said aggregate together with aggregate particles adhering thereto, and said tumbled-off coating and aggregate particles are subjected to an air current to separate same from the aggregate.

References Cited in the file of this patent

UNITED STATES PATENTS

| | | |
|---|---|---|
| 1,731,457 | Fasting | Oct. 15, 1929 |
| 2,005,812 | Thomas | June 25, 1935 |
| 2,244,612 | Crowley | June 3, 1941 |
| 2,442,241 | Koruzo et al. | May 25, 1948 |
| 2,494,695 | Fisher | Jan. 17, 1950 |